United States Patent
Kim et al.

(10) Patent No.: US 10,345,636 B2
(45) Date of Patent: Jul. 9, 2019

(54) POLARIZER, METHOD OF MANUFACTURING THE SAME, AND DISPLAY APPARATUS HAVING THE SAME

(71) Applicant: Samsung Display Co., LTD., Yongin-si (KR)

(72) Inventors: Taewoo Kim, Seoul (KR); Jung Gun Nam, Suwon-si (KR); Sangwook Lee, Yongin-si (KR); Gugrae Jo, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 43 days.

(21) Appl. No.: 15/649,250

(22) Filed: Jul. 13, 2017

(65) Prior Publication Data

US 2018/0059472 A1 Mar. 1, 2018

(30) Foreign Application Priority Data

Aug. 29, 2016 (KR) .................. 10-2016-0109841

(51) Int. Cl.
| | |
|---|---|
| *G02F 1/1335* | (2006.01) |
| *G02B 5/30* | (2006.01) |
| *G02B 5/18* | (2006.01) |
| *G02B 27/28* | (2006.01) |
| *G02F 1/139* | (2006.01) |
| *G02F 1/1337* | (2006.01) |

(52) U.S. Cl.
CPC ..... *G02F 1/133504* (2013.01); *G02B 5/1819* (2013.01); *G02B 5/3058* (2013.01); *G02B 27/281* (2013.01); *G02F 1/1393* (2013.01); *G02F 2001/133742* (2013.01)

(58) Field of Classification Search
None
See application file for complete search history.

(56) References Cited

U.S. PATENT DOCUMENTS

| 6,288,840 B1 | 9/2001 | Perkins et al. |
| 2009/0109377 A1* | 4/2009 | Sawaki ............ G02B 5/1814 349/96 |
| 2010/0079704 A1* | 4/2010 | Cho ................ G02F 1/133617 349/71 |
| 2012/0008205 A1 | 1/2012 | Perkins et al. |
| 2014/0146391 A1* | 5/2014 | Jang ............... G02B 5/3058 359/485.05 |
| 2015/0036083 A1 | 2/2015 | Jang et al. |

FOREIGN PATENT DOCUMENTS

KR 10-20150015910 A 2/2015

* cited by examiner

*Primary Examiner* — Herve-Louis Y Assouman
(74) *Attorney, Agent, or Firm* — H.C. Park & Associates, PLC (57) ABSTRACT

A polarizer includes a base substrate, a wire grid layer having a plurality of protrusions forming a substantially uniform wire grid with a plurality of air gaps disposed between the protrusions, a first layer disposed on the wire grid layer, the first layer including silicon oxide; and a second layer disposed on the first layer, the second layer silicon nitride. Display apparatus incorporating the polarizer and methods of making the same also are disclosed.

19 Claims, 11 Drawing Sheets

POLARIZER, METHOD OF MANUFACTURING THE SAME, AND DISPLAY APPARATUS HAVING THE SAME

CROSS-REFERENCE TO RELATED APPLICATION

This application claims priority from the benefit of Korean Patent Application No. 10-2016-0109841, filed on Aug. 29, 2016, which is hereby incorporated by reference for all purposes as if fully set forth herein.

BACKGROUND

Field

The invention relates generally to a polarizer, a method of manufacturing the polarizer, and a display having the polarizer, and more particularly, exemplary embodiments relate to a polarizer that may be incorporated into a display, a method of manufacturing the polarizer, and a display having the polarizer.

Discussion of the Background

Recently, displays having a light weight and small size have been manufactured. Cathode ray tube (CRT) displays have been used due to performance and competitive price. However, CRT displays are limited with regards to size or portability. Therefore, displays such as plasma displays, liquid crystal displays and organic light emitting displays have been highly regarded due to their small size, light weight and low-power-consumption.

In accordance with optical needs, a display may include a polarizer. General, a film type polarizers have been utilized in displays. Recently, wire grid polarizers offering improved light efficiency and simplified manufacturing processes have been utilized in displays.

The high-temperature in processes utilized to manufacture wire gird polarizers with a capping layer can damage structures of the display. When high temperatures are not used, outgassing creates active unfilled area ("AUA") defects. Additionally, the presence of a capping layer on wire grid polarizers lowers transmittance of the display.

The above information disclosed in this Background section is only for enhancement of understanding of the background of the inventive concepts, and, therefore, it may contain information that does not form the prior art that is already known in this country to a person of ordinary skill in the art.

SUMMARY

Polarizers constructed according to the principles of the invention are capable of improving optical performance and solving outgassing problems, and may be included within a display.

Methods of manufacturing polarizers according to the principles of the invention is may be carried out at a relatively low temperature process.

Additional aspects will be set forth in the detailed description which follows, and, in part, will be apparent from the disclosure, or may be learned by practice of the inventive concepts.

According to one aspect of the invention, a polarizer includes a base substrate, a wire grid layer having a plurality of protrusions forming a substantially uniform wire grid with a plurality of air gaps disposed between the protrusions. A first layer may be disposed on the wire. The first layer may include silicon oxide. A second layer may be disposed on the first layer opposite the wire grid layer. The second layer may include silicon nitride. The first and second layers may be capping layers.

At least one of the gaps between protrusions of the wire grid may include a silicon oxide material adjacent to at least one of the protrusions.

The second layer may include a capping layer having a thickness of about 4000 to 10000 Å. Such a thickness may limit the occurrence of outgassing that can cause active unfilled area defects.

The first layer may include a capping layer having a thickness of about 2000 Å or more.

In addition to the first layer and second layer, a middle layer may be included between the layer and second layer. The middle may include silicon oxynitride.

A second middle layer may be on the second layer. The second middle layer may include silicon oxynitride.

According to another aspect of the invention, a polarizer has a base substrate and a wire grid layer having a plurality of protrusions forming a substantially uniform wire grid with a plurality of air gaps disposed between the protrusions. A first layer having a thickness and disposed on the wire grid includes silicon oxide and silicon nitride. The ratio of silicon oxide to silicon nitride may vary according to the depth in the thickness of the first layer. The first layer may be a capping layer.

The first layer may include a lower layer having a first amount of silicon oxide and a first amount of silicon nitride, an upper layer on a side of the lower layer opposite the wire grid having a second amount of silicon oxide and a second amount of silicon nitride, and an intermediate layer between the upper layer and lower layer having a third amount of silicon oxide lower than the first amount of silicon oxide and the second amount of silicon oxide and a third amount of silicon nitride higher than the first amount of silicon nitride an the second amount of silicon nitride.

According to another aspect of the invention, a method of manufacturing a polarizer includes the steps of: forming on a substrate a wire grid layer having a plurality of protrusions forming a substantially uniform wire grid, forming a first layer including silicon oxide on the wire grid layer, forming between at least two of the protrusions of the wire grid layer an air gap, heating the first layer such that it partially flows between the at least two protrusions to surround the air gap, and forming a second layer including silicon nitride on the first layer.

The first layer and the second layer may be formed at a temperature of about 230° C. or lower.

The second capping layer may be formed as a capping layer having a thickness of about 4000 to 10000 Å, and the first layer may be formed as a capping layer having a thickness of about 2000 Å or more.

The method of manufacturing may include the further steps of forming a first middle layer including silicon oxynitride may be formed on the first layer before forming the second layer, and forming a second middle layer including silicon oxynitride on the second layer.

According to another aspect of the invention, a method of manufacturing a polarizer includes forming on a substrate a wire grid layer having a plurality of protrusion forming a substantially uniform wire grid, forming a first layer having a thickness on the wire grid, the first layer including silicon nitride and silicon oxide, wherein the ratio of silicon oxide to silicon nitride varies according to the depth in the thickness of the first layer, and forming between at least two of the protrusion of the wire grid layer an air gap having silicon oxide adjacent to at least on of the two protrusions.

The step of forming the first layer may include forming a lower layer having a first amount of silicon oxide and a first amount of silicon nitride, forming an upper layer on a side of the lower layer opposite the wire grid having a second amount of silicon oxide and a second amount of silicon nitride, and forming an intermediate layer between the upper layer and the lower having a third amount of silicon oxide lower than the first amount of silicon oxide and the second amount of silicon oxide and a third amount of silicon nitride higher than the first amount of silicon nitride and the second amount of silicon nitride.

The first layer may be formed by a chemical vapor deposition process including providing a first gas including an initial amount of $SiH_4$ and $N_2O$, increasing the amount of $NH_3$ and $N_2$ within the first gas as to provide a second gas including $SiH_4$, $N_2O$, $NH_3$ and $N_2$, and decreasing the amount of $NH_3$ and $N_2$ within the second gas as to provide a third gas including $SiH_4$ and $N_2O$.

According to yet another aspect of the invention, a display apparatus includes a TFT substrate, an opposite substrate facing the TFT substrate; and a liquid crystal layer between the TFT substrate and the opposite substrate, wherein the opposite substrate includes a base substrate, a wire grid layer having a plurality of protrusions forming a substantially uniform wire grid and a plurality of air gaps disposed between the protrusions, a first layer disposed on the wire grid layer including silicon oxide, and a second layer disposed on the first layer including silicon nitride.

The display apparatus may include a black matrix on a side of the second layer and an over-coating layer disposed on the black matrix.

A color conversion layer having a phosphor and/or a quantum dot may be provided on the base substrate.

According to another aspect of the invention, a polarizer includes a base substrate, a wire grid layer having a plurality of protrusion forming a substantially uniform wire grid and a plurality of air gaps disposed between the protrusions, and a first layer disposed on the wire grid layer, the first layer including silicon oxide, silicon nitride and having a thickness of about 4000 to about 10000 Å.

According to the principles of the invention, when the material constituting the first layer includes silicon oxide having a relatively low refractive index, even if silicon oxide is partially introduced into the gaps between protrusions of the wire grid layer, degradation of the optical performance of the polarizer may not be great.

When the first layer includes silicon oxide, and the second layer includes silicon nitride, the refractive index of the first layer may be lower than that of the second layer. Accordingly, transmittance may be improved by reducing reflection at an interface of the second layer.

In addition, since the second layer has a sufficient thickness, active unfilled area defects due to outgassing of the air gap and/or the first layer may be reduced, if not prevented. Outgassing may also be reduced, if not prevented, by the multilayer structure.

In addition, forming the layers at a relative low temperature of approximately 230° C. or lower may reduce, if not prevent, damage to organic structures, such as phosphors and quantum dots.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
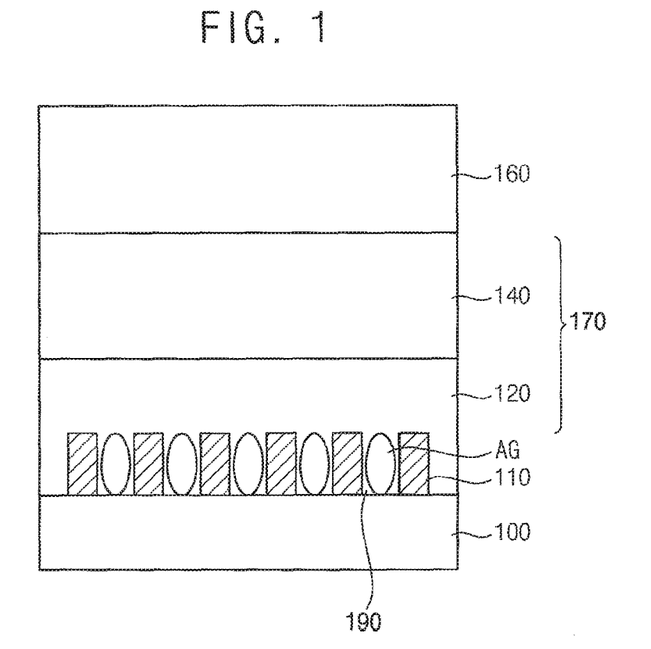
FIG. 1 is a cross-sectional view illustrating a first embodiment of a polarizer having first and second capping layers constructed according to the principles of the invention.

Referring to FIG. 1, the polarizer may include a base substrate 100, a wire grid layer 110, a capping layer 170 and an over-coating layer 160. The capping layer 170 may comprise a first capping layer 120 and a second capping layer 140.

The base substrate 100 is a base layer for the wire grid layer 110. A display incorporating the polarizer may include a TFT substrate, a liquid crystal layer disposed on one side of the TFT substrate, and the base substrate disposed on a side of the liquid crystal layer opposite the TFT substrate.

The base substrate 100 may include a material having excellent light transmittance, heat resistance, and/or chemical resistance. All or a portion of such properties may be provided by base substrate including at least one of glass, quartz, and a transparent resin. Possible transparent resins include, but are not limited to, polyimide-based resin, acryl-based resin, polyacrylate-based resin, polycarbonate-based resin, polyether-based resin, sulfonic acid containing resin, polyethyleneterephthalate-based resin, and any combination thereof.

A wire grid layer 110 may be formed as a pattern layer having a plurality of protrusions spaced a regular intervals to form a uniform wire grid. The protrusions may have a pitch of about 50 nm to 150 nm defined by the sum of the width of a protrusion and the distance between adjacent protrusions.

The wire grid layer 110 may include various metals, such as, but not limited to, aluminum, titanium, gold, chromium, silver, copper, nickel, iron, cobalt, and alloys thereof.

A gap 180 may be formed between two adjacent protrusions of the wire grid layer 110. Gap 180 may be filled with air as to provide an air gap.

First capping layer 120 may be disposed on a side of the wire grid layer 110 opposite base substrate 100. First capping layer 120 may include silicon oxide. A portion of first capping layer 120 may be allowed to enter the spaces between protrusions of the wire grid layer 110 during manufacturing. Accordingly, the portion of the first capping layer 120 flowing into the spaces in the grid may form a shape 190 surrounding gap 180.

First capping layer 120 may have a thickness greater than or equal to the minimum thickness of wire grid pattern layer 110. For example, first capping layer 120 may have a thickness greater than approximately 2000 Å.

In order to improve optical performance of the polarizer, it is preferable that the space between two adjacent protrusions of the wire grid pattern layer 110 be completely empty, that is, it is preferable that the air gap AG and the protrusions are in direct contact with each other. However, in the manufacturing process of the first capping layer 120, material from the first capping layer 120 is apt to be partially introduced into the space between the two adjacent protrusions. However, since the material constituting the first capping layer 120 is silicon oxide having a relatively low refractive index, even if silicon oxide is partially introduced around the air gap AG, degradation of the optical performance of the polarizer may not be large. Accordingly, it may not be necessary to prevent the material of first capping layer 120 from forming surrounding portions 190.

Second capping layer 140 may be disposed on a side of first capping layer 120 opposite wire grid layer 110. Second capping layer 140 may include silicon nitride. Second capping layer 140 may have thickness of approximately 4000 Å to 10000 Å.

Providing the second capping layer with a thickness of approximately 4000 Å to 10000 Å may inhibit, if not prevent, active unfilled area defects due to outgassing of gap 180 and/or first capping layer 120.

Figure 5:
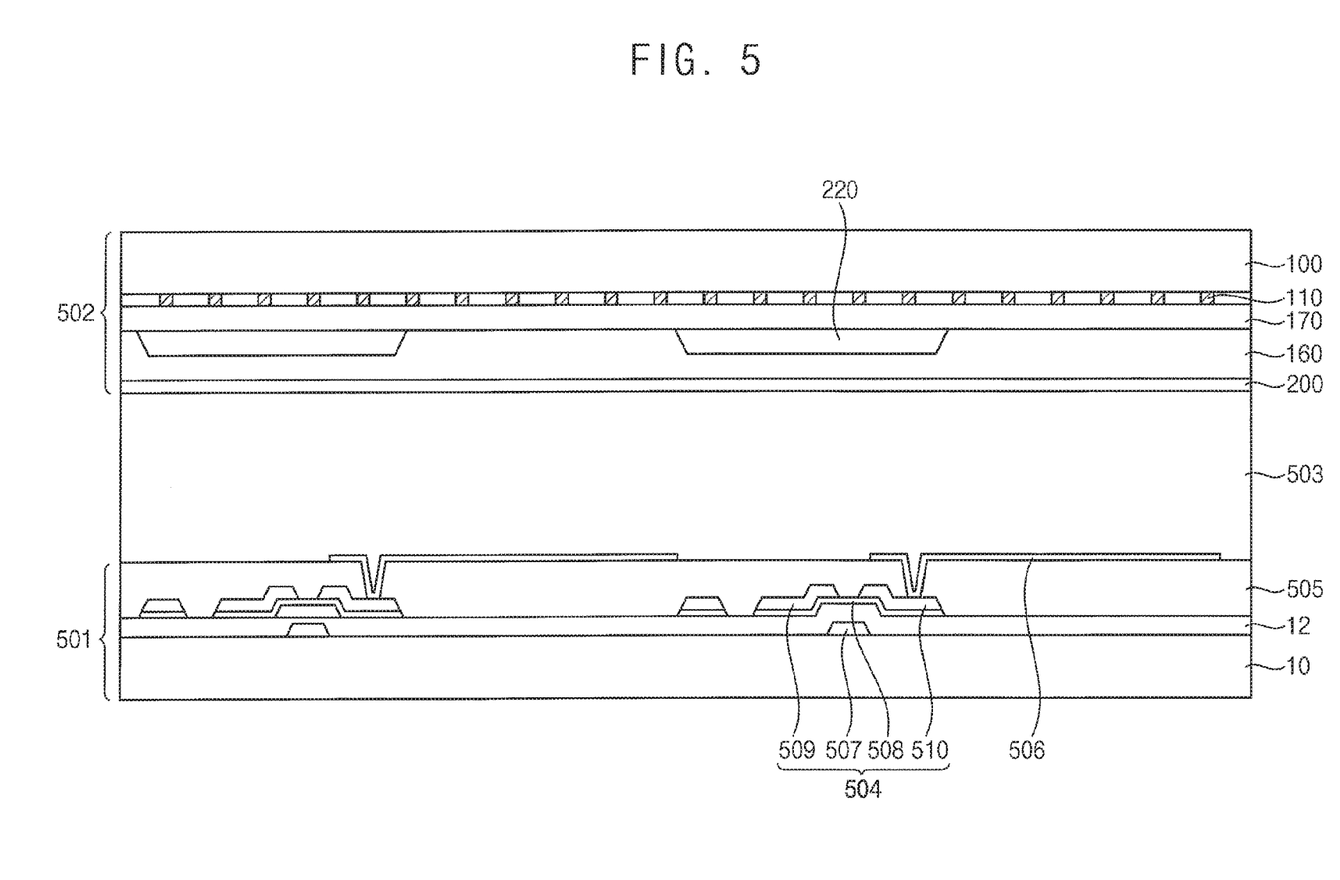
FIG. 5 is a cross-sectional view illustrating a first embodiment of a display having a polarizer such as one constructed according to the embodiments of FIGS. 1-4.

Over-coating layer 160 may be disposed on a side of second capping layer 140 opposite first capping layer 120. Over-coating layer 160 may be an over-coating layer of an opposite substrate of a display, such as shown in FIG. 5.

As first capping layer 120 includes silicon oxide, and second capping layer 140 includes silicon nitride, the refractive index of first capping layer 120 may be lower than that of second capping layer 140. Such an arrangement may improve transmittance by reducing reflection at an interface of second capping layer 140.

Figure 2:
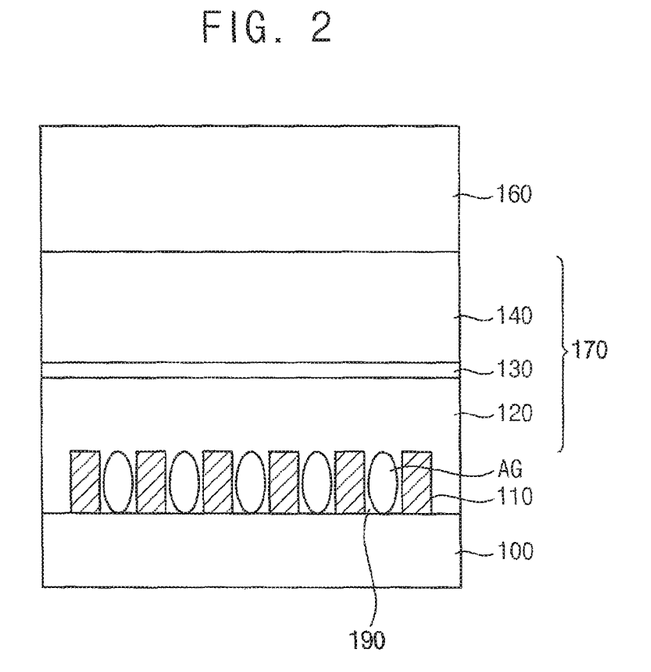
FIG. 2 is a cross-sectional view illustrating a second embodiment of a polarizer constructed according to the principles of the invention having a middle layer disposed between two capping layers.

Referring to FIG. 2, the polarizer may include a base substrate 100, a wire grid layer 110, a capping layer 170 and an over-coating layer 160. The capping layer 170 may include a first capping layer 120, a first middle layer 130 and a second capping layer 140. The polarizer of FIG. 2 may be substantially same as the polarizer of FIG. 1, except that the polarizer further includes the first middle layer 130. Thus, any further detailed descriptions concerning the same elements will be omitted to avoid redundancy.

First middle layer 130 may be disposed between first capping layer 120 and second capping layer 140.

First middle layer 130 may include a material having a refractive index between the refractive indexes of first capping layer 120 and second capping layer 140. The first middle layer 130 may be formed from silicon oxynitride.

First middle layer 130 need not be thick. Depending on the manufacturing process, it may be preferable that first middle layer 130 have a minimum thickness of approximately 50 Å or more.

Transmittance may be improved by a first capping layer including silicon oxide, a second capping layer including silicon nitride, and a first middle layer including silicon oxynitride. Such an arrangement may reduce reflection at the interface of the second capping layer.

Figure 3:
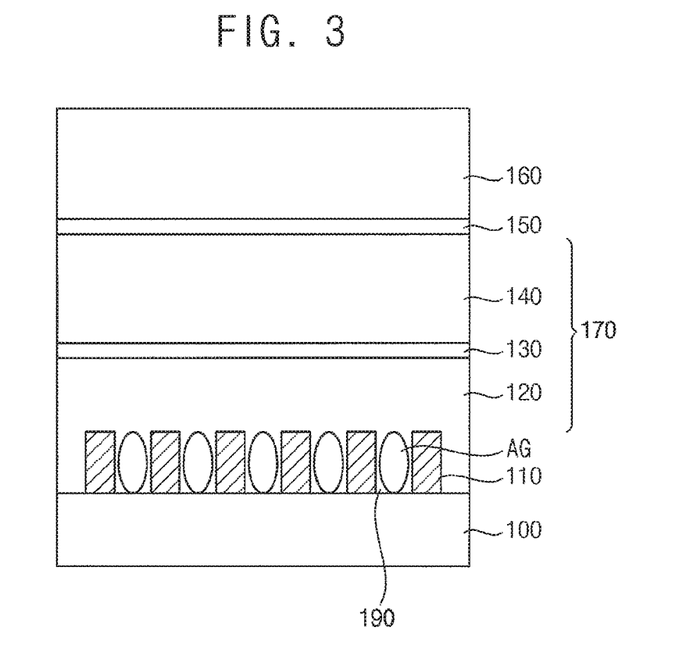
FIG. 3 is a cross-sectional view illustrating a third embodiment of a polarizer constructed according to the principles of the invention having a second middle layer.

Referring to FIG. 3, the polarizer may include a base substrate 100, a wire grid layer 110, a capping layer 170 and an over-coating layer 160. Capping layer 170 may include a first capping layer 120, a first middle layer 130, a second capping layer 140 and a second middle layer 150. The polarizer may be substantially same as the polarizer of FIG. 2 except for further including the second middle layer 150. Thus, any further detailed descriptions concerning the same elements will be omitted to avoid redundancy.

Second middle layer 150 may be disposed between second capping layer 140 and over-coating layer 160.

Second middle layer 150 may be formed from a material having a refractive index between the refractive indexes of second capping layer 140 and over-coating layer 160. The refractive index of over-coating layer 160 may be smaller than that of second capping layer 140. For example, second capping layer 140 may include silicon nitride, over-coating layer 160 may include an acrylic epoxy compound, and second middle layer 150 may include silicon oxynitride.

Second middle layer 150 need not be thick. Depending on the manufacturing process, it may be preferable that second middle layer 150 have a minimum thickness of approximately 50 Å or more.

Transmittance may be improved by a second capping layer including the silicon nitride, an over-coating layer including an acrylic epoxy compound, and a second middle layer including silicon oxynitride. Such an arrangement may reduce reflection at the interface of the second capping layer.

Figure 4:
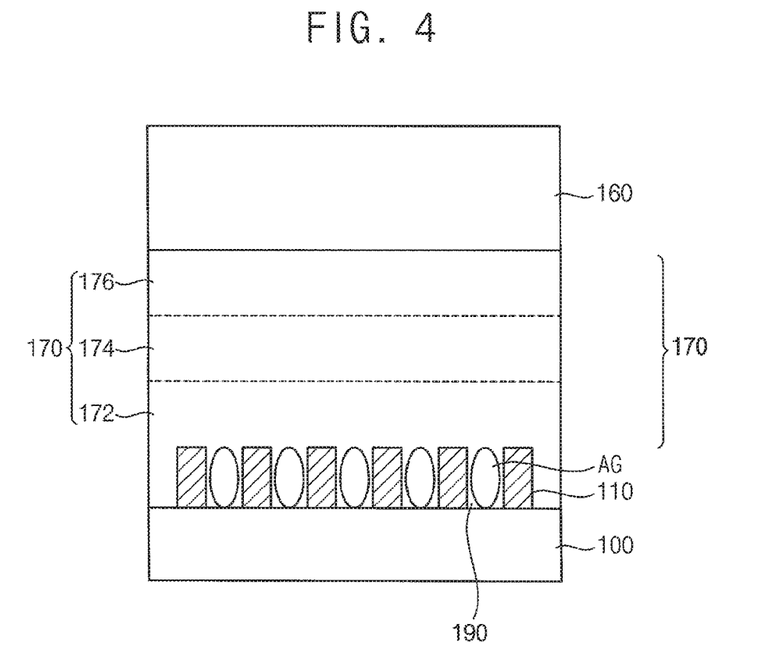
FIG. 4 is a cross-sectional view illustrating a fourth embodiment of a polarizer constructed according to the principles of the invention having a gradual capping layer with a variable refractive index.

Referring to FIG. 4, the polarizer may include a base substrate 100, a wire grid layer 110, a capping layer 170 and an over-coating layer 160. The capping layer 170 may include a varying chemical composition providing a refractive index that varies according to depth (thickness). The polarizer may be substantially same as the polarizer of FIG. 1, except for including the gradual capping layer 170 instead of the first and second capping layer 120 and 140. Thus, any further detailed descriptions concerning the same elements will be omitted to avoid redundancy.

Capping layer 170 may include a lower layer 172, an intermediate layer 174, and an upper layer 176 which have indistinct or varying boundaries providing a gradual composition. The lower layer 172 may be disposed on a side of wire grid pattern layer 110 opposite base substrate 100. Intermediate layer 174 may be disposed on a side of lower layer 172 opposite wire grid layer 100. Upper layer 176 may be disposed on a side of intermediate layer 174 opposite lower layer 172. The boundaries between lower layer 172, intermediate layer 174, and upper layer 176 may be indistinct.

Lower layer 172 and upper layer 176 may each have a higher amount of silicon oxide than intermediate layer 174. Intermediate layer 174 may have a higher amount of silicon nitride than each of lower layer 172 and upper layer 176. Capping layer 170 may have a varying ratio of silicon oxide to silicon nitride depending upon its depth (thickness). Accordingly, the refractive index of capping layer 170 may gradually increase from lower layer 172 to intermediate layer 174. The refractive index of capping layer 170 may gradually decrease from intermediate layer 174 to upper layer 176.

Capping layer 170 may have a thickness of approximately 4000 Å or more. For example, the intermediate layer 174 may have a thickness of approximately 4000 Å or more.

The gradual capping layer 170 may be formed in one process. For example, the unclear boundaries between lower layer 172, intermediate layer 174, and upper layer 176 may be formed by changing the composition of deposited materials during manufacture, such as described in connection for FIGS. 12A and 12B below.

Referring to FIG. 5, the display may include a TFT substrate 501, an opposite substrate 502 which faces the TFT substrate 501, and a liquid crystal display layer 503 between TFT substrate 501 and opposite substrate 502.

TFT substrate 501 may include a TFT base substrate 10, a gate insulating layer 12, a thin film transistor 504, a color filter 505, and a pixel electrode 506.

The TFT base substrate 10 may include a material having excellent light transmittance, heat resistance, and/or chemical resistance. All or a portion of such properties may be provided by a TFT base substrate 10 including at least one of glass, a quartz, and a transparent resin.

A gate pattern may be disposed on the TFT base substrate 10. The gate pattern may include at least one of a metal, an alloy, a conductive metal oxide, and a transparent conductive material. The gate pattern may include a gate electrode 507 and a signal line for transmitting a driving signal of a pixel, such as a gate line.

The gate insulating layer 12 may be disposed on the TFT base substrate 10 on which the gate pattern is formed. The gate insulating layer 12 may include at least one of silicon oxide, and metal oxide.

An active pattern 508 may be disposed to overlap gate electrode 507 on gate insulating layer 12. Active pattern 508 may have an impurity doped source, an impurity doped drain area, and a channel area between the source area and the drain area.

A data pattern including a source electrode 509 contacting the source area of active pattern 508 and a drain electrode 510 contacting to the drain area of active pattern 508 may be disposed on the active pattern 508. The data pattern may include at least one of a metal, an alloy, a conductive metal oxide, and a transparent conductive material. The data pattern may further include a signal line for transmitting a driving signal of the pixel, such as a data line.

Thin film transistor 504 may include gate electrode 507, active pattern 508, source electrode 509 and drain electrode 510.

The color filter 505 may be disposed on gate insulating layer 12. The color filter 505 may provide color to light transmitted through liquid crystal layer 503. The color filter 505 may be a red color filter, a green color filter, and a blue color filter. Color filters 505 may be provided corresponding to each pixel and may be arranged to have different colors between adjacent pixels. Color filters 505 may partially overlap at the boundaries of adjacent pixels. Color filters 505 may be spaced from the boundaries of adjacent pixels.

The pixel electrode 506 may be disposed on color filter 505. Pixel electrode 506 may be electrically connected to the drain electrode 510 of the thin film transistor 504 through a contact hole of color filter 505. Pixel electrode 506 may include a transparent conductive material. Pixel electrode 506 may include at least one of indium tin oxide and indium zinc oxide.

Opposite substrate 502 may include a base substrate 100, a wire grid layer 110, a capping layer 170, a black matrix 220, an over-coating layer 160, and a common electrode 200.

Base substrate 100 may include a material having excellent light transmittance, heat resistance, and/or chemical resistance. Such properties may be provided by base substrate 100 include at least one of a glass, a quartz, and a transparent resin.

The wire grid layer 110 may be disposed on the base substrate 100. The wire grid pattern layer 110 may include a plurality of protrusions having same shape and formed at uniform intervals to form a wire grid. The protrusions may have pitch of approximately 50 nm (nanometers) to 150 nm. The pitch may be defined as sum of width of one of the protrusion and a distance between protrusions disposed adjacent to each other. The protrusions may have pitch of approximately 50 nm (nanometers) to 150 nm. The wire grid layer 110 may include metal. An air gap (see, e.g., 180 of FIG. 1) may be formed between two adjacent protrusions of the wire grid pattern layer 110. Air may be filled in the air gap.

The capping layer 170 may be disposed on the wire grid pattern layer 110. The capping layer may be substantially same as the capping layer of FIG. 1, FIG. 2, FIG. 3 or FIG. 4 or other type of capping layer known in the art.

Black matrix 220 may be disposed on capping layer 170. Black matrix 220 may correspond to areas outside of pixel areas, which may display an image, and may block light. Black matrix 220 may overlap the data line, the gate line, and/or thin film transistor 504.

Over-coating layer 160 may be formed on the black matrix 220. Over-coating layer 160 may planarize and/or protect the black matrix 220 and/or capping layer 170. Over-coating layer 160 may insulate the common electrode 200. Over-coating layer 160 may include an acrylic epoxy compound.

Common electrode 200 may be disposed on over-coating layer 160. Common electrode 200 may include a transparent conductive material. Common electrode 200 may include at least one indium tin oxide and indium zinc oxide.

Liquid crystal layer 503 may be disposed between TFT substrate 501 and substrate 502. Liquid crystal layer 503 may include molecules having optical anisotropy. The liquid crystal molecules may be driven by an electric field to transmit and/or block light passing through liquid crystal layer 503, as to display the image. A display may further include alignment layers between a liquid crystal layer and TFT substrate. An alignment layer may be included between a liquid crystal and an opposite substrate 502. Alignment layers may set an initial alignment direction of the liquid crystal molecules of a liquid crystal layer.

The configuration of the display can be changed as needed. For example, a color filter may be included in an opposite substrate.

Figure 6:
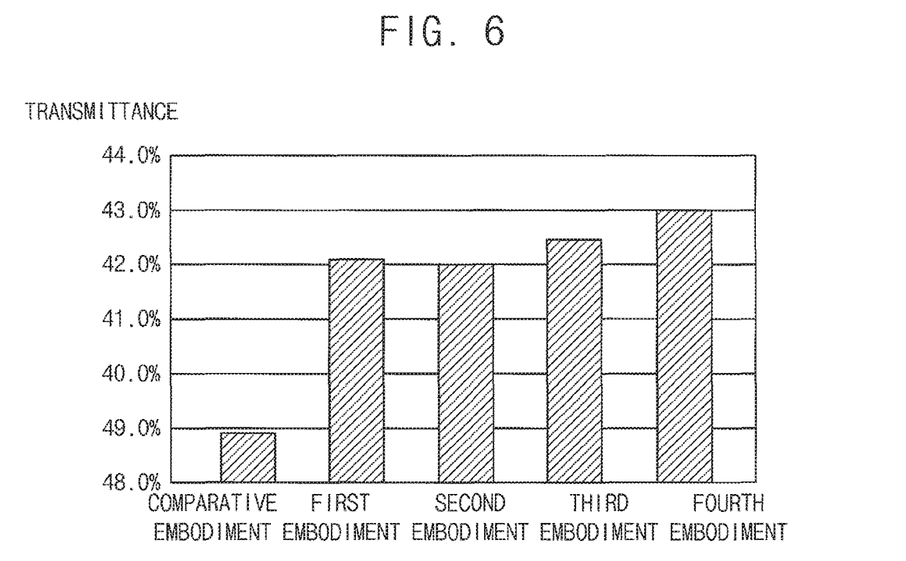
FIG. 6 is a graph demonstrating improved transmittance of polarizers constructed according to the first to fourth embodiments of FIGS. 1-4.
Figure 7:
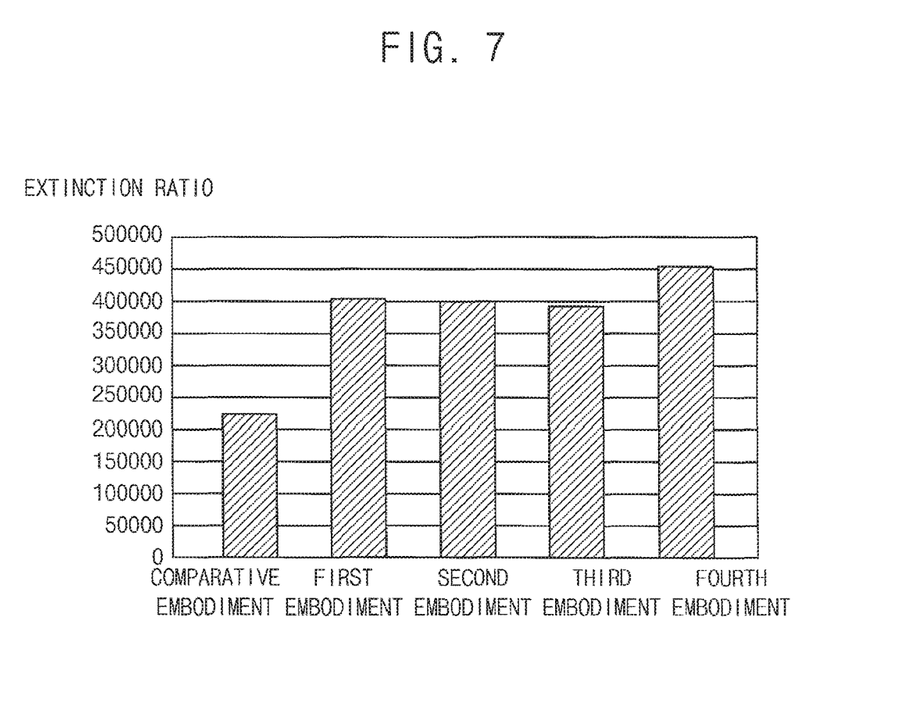
FIG. 7 is a graph demonstrating improved extinction rations of polarizers constructed according to the first to fourth embodiments of FIGS. 1-4.

Referring to FIGS. 6 and 7, the comparative embodiment is a polarizer having a silicon nitride capping layer with a thickness of 4000 Åk.

First embodiment is a polarizer in accordance with FIG. 1, second embodiment is a polarizer in accordance with FIG. 2, third embodiment is a polarizer in accordance with FIG. 3, and fourth embodiment is a polarizer in accordance with FIG. 4.

First embodiment includes a capping layer having a 2000 Å thick silicon oxide first capping layer and a 4000 Å thick silicon nitride second capping layer.

Second embodiment including a capping layer having a 2000 Å thick silicon oxide first capping layer, a 2000 Å thick silicon oxynitrde first middle layer and a 4000 Å thick silicon nitride second capping layer. Third embodiment includes a capping layer having a 2000 Å thick silicon oxide first capping layer, a 2000 Å thick silicon oxynitrde first middle layer, a 4000 Å thick silicon nitride second capping layer and a 2000 Å thick silicon oxynitrde second middle layer.

Fourth embodiment includes a 4000 Å thick capping layer having a unclear boundaries between a lower layer, an intermediate layer, and an upper layer. The lower layer and the upper layer have a higher content of silicon oxide than the intermediate layer. The intermediate layer has a higher content of silicon nitride than the lower layer and the upper layer. The capping layer fourth embodiment, accordingly, has a varying ratio of silicon oxide to silicon nitride depending upon its thickness.

FIG. 6 is a graph showing transmittances of the comparative embodiment and the first to fourth embodiments. From this, it can be seen that polarizers of the first to fourth embodiments have a higher transmittance than the comparative example.

FIG. 7 is a graph showing extinction ratios of the comparative embodiment and the first to fourth embodiments. From this, it can be seen that polarizers of the first to fourth embodiments have a higher extinction ratio than the comparative example.

Figure 8:
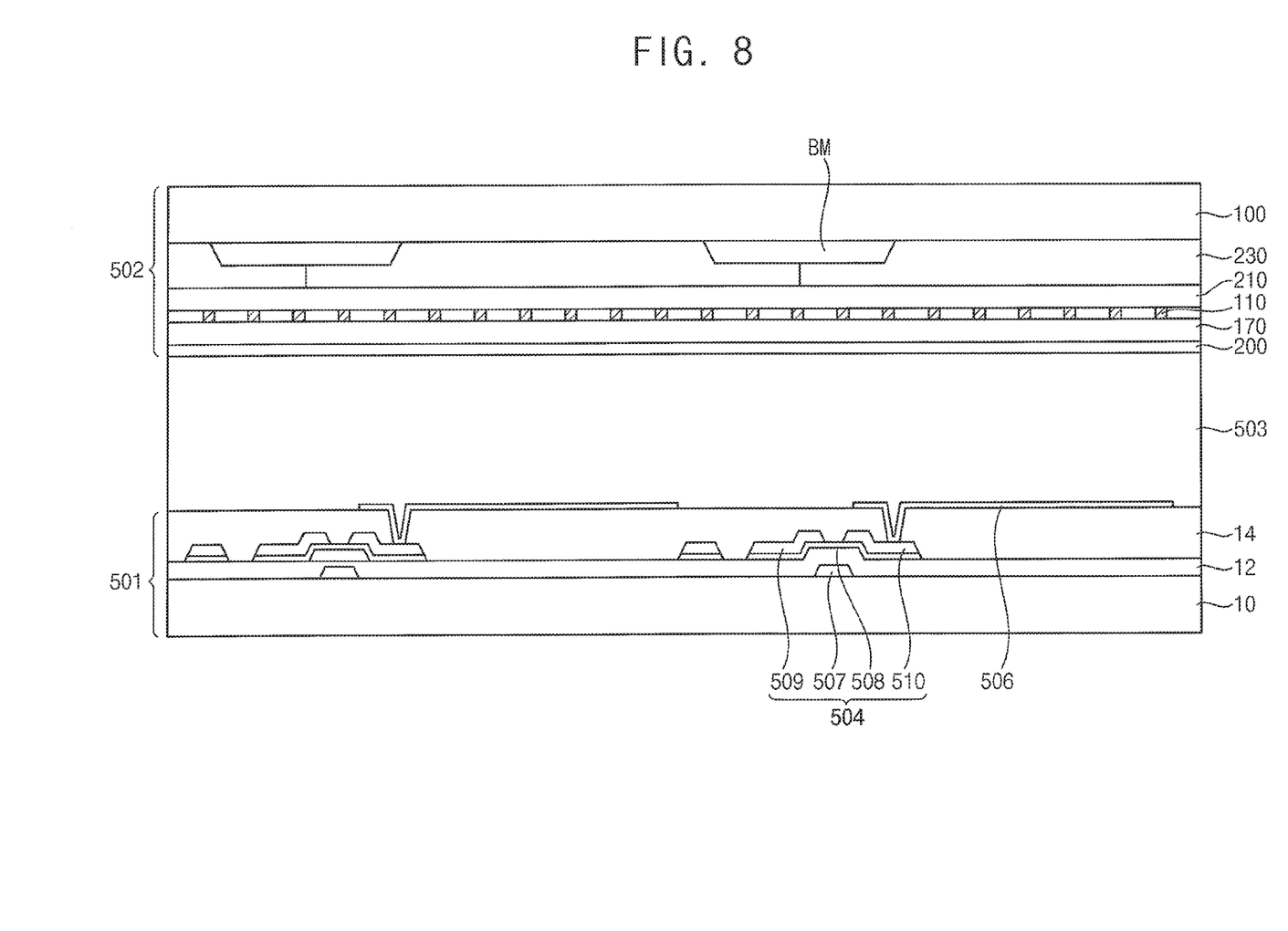
FIG. 8 is a cross-sectional view illustrating a second embodiment of a display having a polarizer such as one constructed according to the embodiments of FIGS. 1-4.

Referring to FIG. 8, the display may include a TFT substrate 501, an opposite substrate 502, and a liquid crystal layer 503 between TFT substrate 501 and opposite substrate 502.

TFT substrate 501 may include a TFT base substrate 10, a gate insulating layer 12, a thin film transistor 504, a data insulating layer 14, and a pixel electrode 506.

The TFT base substrate 10 may include a material having excellent light transmittance, heat resistance, and/or chemical resistance. All or a portion of such properties may be provided by a TFT base substrate 10 including at least one of glass, a quartz, and a transparent resin.

A gate pattern may be disposed on the TFT base substrate 10. The gate pattern may include at least one of a metal, an alloy, a conductive metal oxide, and a transparent conductive material. The gate pattern may include a gate electrode 507 and a signal line for transmitting a driving signal of a pixel, such as a gate line.

The gate insulating layer 12 may be disposed on the TFT base substrate 10 on which the gate pattern is formed. The gate insulating layer 12 may include at least one of silicon oxide, and metal oxide.

An active pattern 508 may be disposed to overlap gate electrode 507 on gate insulating layer 12. Active pattern 508 may have an impurity doped source, an impurity doped drain area, and a channel area between the source area and the drain area.

A data pattern including a source electrode 509 contacting the source area of active pattern 508 and a drain electrode 510 contacting to the drain area of active pattern 508 may be disposed on the active pattern 508. The data pattern may include at least one of a metal, an alloy, a conductive metal oxide, and a transparent conductive material. The data pattern may further include a signal line for transmitting a driving signal of the pixel, such as a data line.

Thin film transistor 504 may include gate electrode 507, active pattern 508, source electrode 509 and drain electrode 510.

The data insulating layer 14 may be disposed on the gate insulating layer 12 on which the data pattern is formed. The data insulating layer 14 may include at least one of silicon oxide and a metal oxide.

The pixel electrode 506 may be disposed on data insulating layer 14. Pixel electrode 506 may be electrically connected to the drain electrode 510 of the thin film transistor 504 through a contact hole of color filter 505. Pixel electrode 506 may include a transparent conductive material. Pixel electrode 506 may include at least one of indium tin oxide and indium zinc oxide.

Opposite substrate 502 may include a base substrate 100, a wire grid layer 110, a capping layer 170, a black matrix 220, an over-coating layer 160, color conversion layer 230, a planarization layer 210, and a common electrode 200.

Base substrate 100 may include a material having excellent light transmittance, heat resistance, and/or chemical resistance. Such properties may be provided by base substrate 100 include at least one of a glass, a quartz, and a transparent resin.

Black matrix 220 may be disposed on base substrate 100. Black matrix 220 may correspond to areas outside of pixel areas, and may block light. Black matrix 220 may overlap the data line, the gate line, and/or thin film transistor 504.

Color conversion layer 230 may be formed on the black matrix 220. Planarization layer 210 may planarize and/or protect black matrix 220 and/or color conversion layer 230.

Color conversion layer 230 may convert the color of light supplied from a light source, such as a backlight assembly.

Color conversion layer 230 may include at least one of a green and red phosphor. Color conversion layer 230 may convert blue light supplied from a light source into green light and/or red light.

Color conversion layer 230 may include a quantum dot changing color according to its size.

The quantum dots may include a core and a shell enclosing the core. The core may include least one of a material of a II-IV group semiconductor, such as ZnS, ZnSe, ZnTe, CdS, CdSe, CdTe, HgS, HgSe, or HgTe, a IV-VI group semiconductor such as PbS, PbSe, or PbTe, and a III-V group semiconductor including, such as AN, AlP, AlAs, AlSb, GaN, GaP, GaAs, GaSb, InN, InP, InAs, or InSb. The shell may include least one of CdS, ZnS, CdSe, CdSeS, ZnSe, ZnSeS, CdTe, ZnTe and PbS.

Planarization layer 210 may be disposed on color conversion layer 230. Planarization layer 210 may provide a flat surface compensating for steps within black matrix 220 and/or color conversion layer 230. Planarization layer 210 may include at least one of an acrylic resin, a polyamide resin, a polycarbonate resin, or the like.

The wire grid pattern 110 may be disposed on the planarization layer 210. The wire grid layer 110 may include a plurality of protrusions having substantially the same shape and formed at uniform intervals to form a wire grid. The protrusions may have pitch of about 50 nm (nanometers) to 150 nm. The wire grid pattern layer 110 may include metal. An air gap (see, e.g., 180 of FIG. 1) may be formed between two adjacent protrusions of the wire grid pattern layer 110. Air may be filled in the air gap.

The capping layer 170 may be disposed on the wire grid pattern layer 110. The capping layer 170 may be substantially same as the capping layer of the polarizer of FIG. 1, 2, 3 or 4.

Common electrode 200 may be disposed on capping layer 170. The common electrode 200 may include a transparent conductive material.

The liquid crystal layer 503 may be disposed between the TFT substrate 501 and the opposite substrate 502. Liquid crystal layer 503 may include molecules having optical anisotropy. The liquid crystal molecules may be driven by an electric field to transmit and/or block light passing through liquid crystal layer 503, as to display the image. The display may further include alignment layers between a liquid crystal layer and TFT substrate. An alignment layer may be included between a liquid crystal and an opposite substrate 502. Alignment layers may set an initial alignment direction of the liquid crystal molecules of a liquid crystal layer.

Figure 9A:
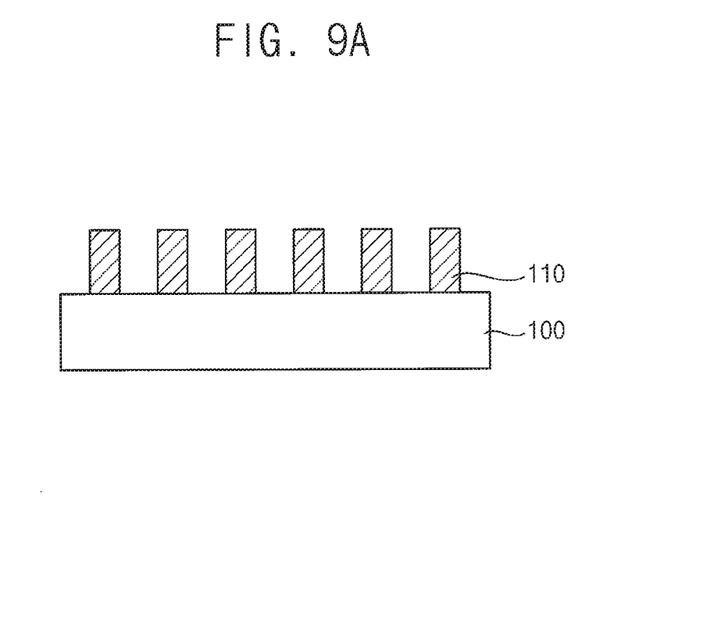
FIGS. 9A, 9B, 9C and 9D are cross-sectional views illustrating a first exemplary method of manufacturing a polarizer according to the principles of the invention.

Referring to FIG. 9A, a wire gird layer 110, such as a pattern layer, is formed on a base substrate 100. The wire grid pattern layer 110 may be formed by imprint lithography or other known techniques. For example, a metal layer may be formed on the base substrate 100, and then a resin layer may be formed on the metal layer. An imprint resin pattern may be formed in the resin layer using an imprint mold. Wire grid layer 110 may be formed by patterning the metal layer using the imprint resin pattern.

Figure 9B:
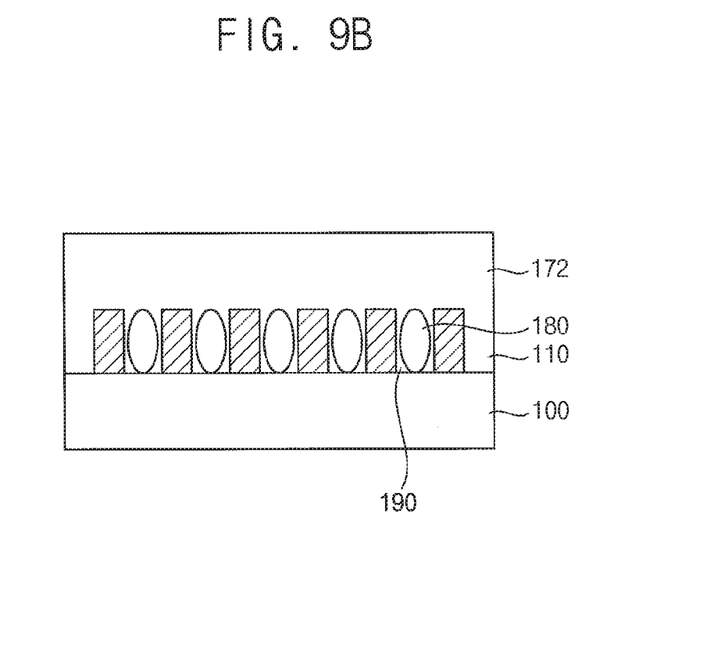

Referring to FIG. 9B, a first capping layer 120 including silicon oxide may be formed on a side of wire grid layer 110 opposite substrate 100 by chemical vapor deposition or other known techniques at a temperature lower than approximately 230° C.

Figure 9C:
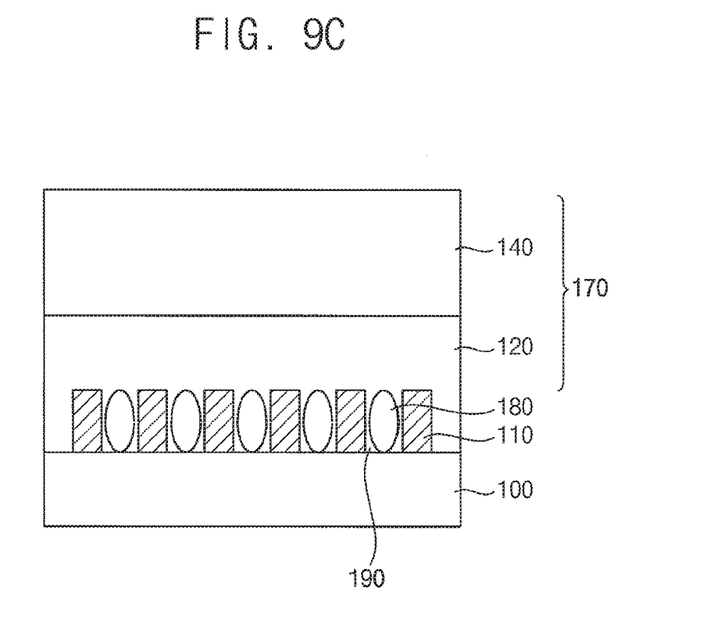

Referring to FIG. 9C, a second capping layer 140 including silicon nitride may be formed on a side of first capping layer 120 opposite the wire grid layer 110 by chemical vapor deposition or other known techniques at a temperature lower than approximately 230° C. Accordingly, the second capping layer 140 may be formed by a process which is performed at a temperature lower than about 230° C.

Outgassing may be reduced or prevented by forming first capping layer 120 and second capping layer 130 at a temperature of about 370° C. or higher. However, such high temperatures may damage organic materials, such as color conversion layers, beneath the capping layer.

Such damage may be avoided by forming the first and/or second capping layer at a relative low process temperature of approximately 230° C. Outgassing problems can be reduced by the multi layer structure of the capping layer constructed according to the principles of the invention.

Figure 9D:
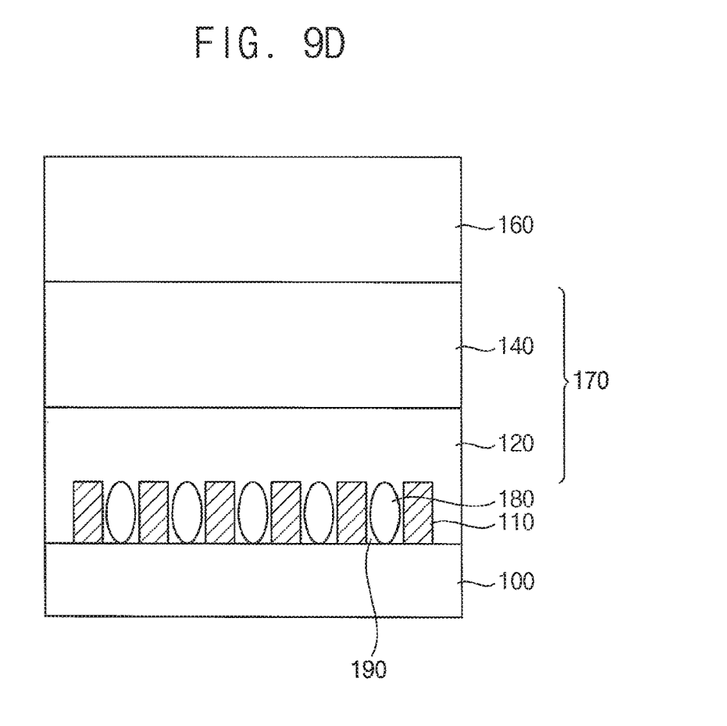

Referring to FIG. 9D, an over-coating layer 160 may be formed on the second capping layer 140. The methods of manufacturing the polarizer may further include various processes as required. For example, after forming second capping layer 140, other structures desired for the display, such as a black matrix, may be provided before forming over-coating layer 160.

Figure 10A:
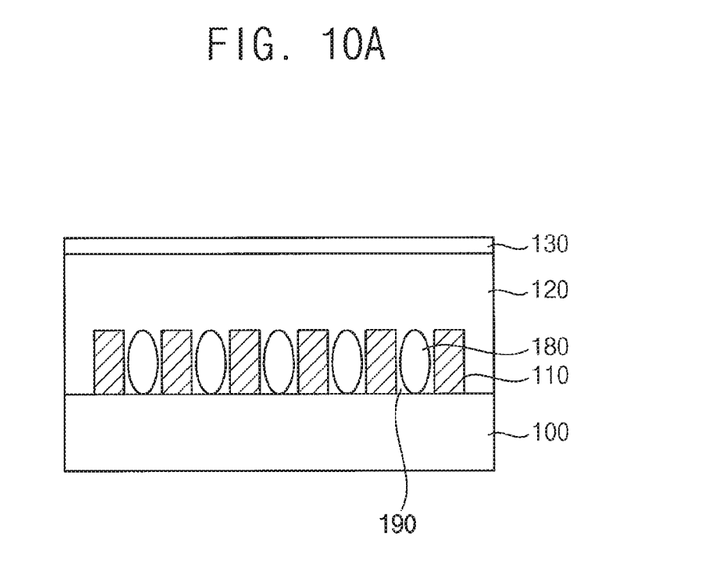
FIGS. 10A, 10B and 10C are cross-sectional views illustrating a second exemplary method of manufacturing a polarizer according to the principles of the invention.

Referring to FIG. 10A, a wire grid layer 110 may be formed on a base substrate 100. A first capping layer 120 may be formed on a side of wire grid layer 110 opposite base substrate 100.

A first middle layer 130 including silicon oxynitride may be formed on a side of first capping layer 120 opposite wire grid layer 110 by chemical vapor deposition at a temperature lower than approximately 230° C.

Figure 10B:
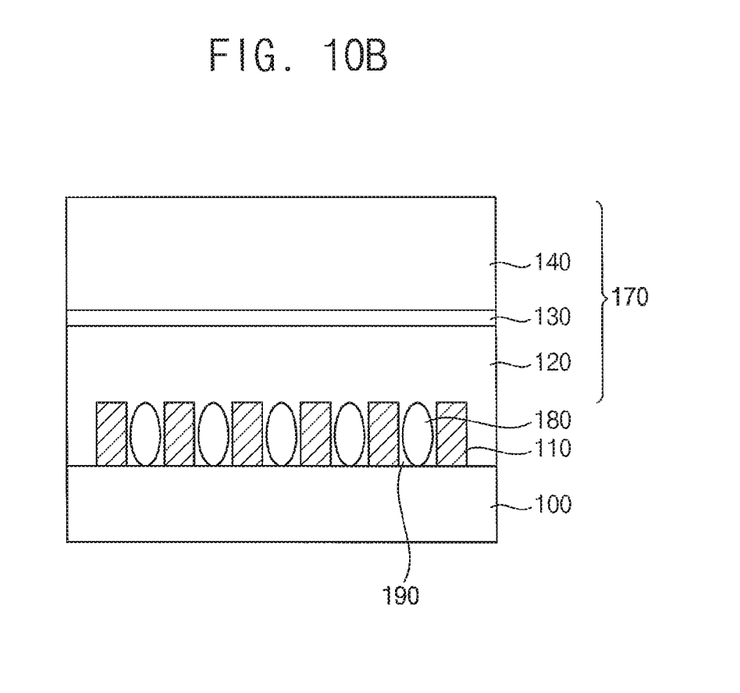

Referring to FIG. 10B, a second capping layer 140 including silicon nitride may be formed on a side of middle layer 130 opposite first capping layer 120 by chemical vapor deposition at a temperature lower than approximately 230° C. Accordingly, the second capping layer 140 may be formed by a process which is performed at a temperature lower than about 230° C.

Figure 10C:
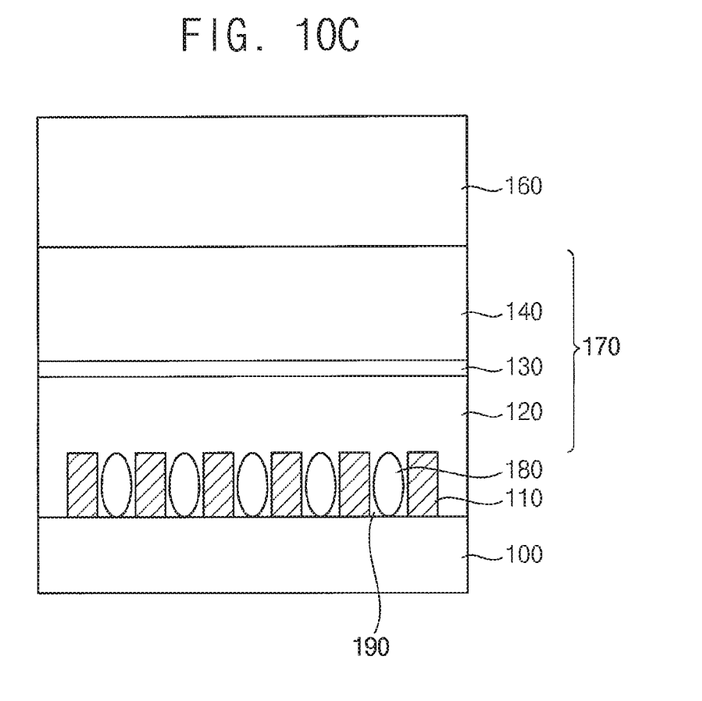

Referring to FIG. 10C, an over-coating layer 160 may be formed on second capping layer 140. The method of manufacture the polarizer may further include various other processes required to produce the desired display.

Figure 11A:
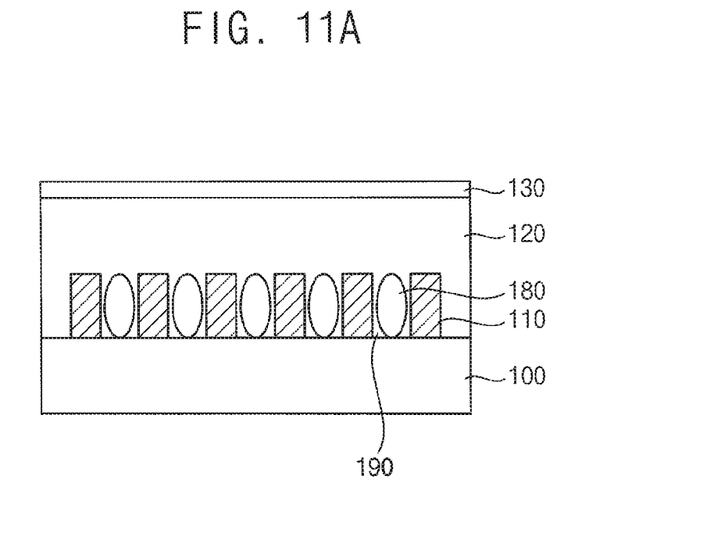
FIGS. 11A, 11B and 11C are cross-sectional views illustrating a third exemplary method of manufacturing a polarizer according to the principles of the invention method of manufacturing a polarizer.

Referring to FIG. 11A, a wire grid layer 110 may be formed on a base substrate 100. A first capping layer 120 may be formed on a side of wire grid layer 110 opposite base substrate 100. A first middle layer 130 may be formed on a side of first capping layer 120 opposite wire grid layer 110.

Figure 11B:
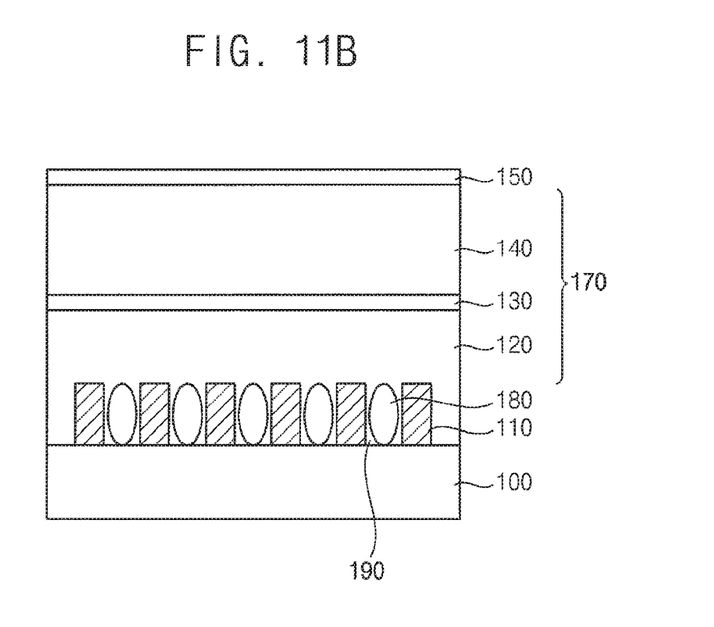

Referring to FIG. 11B, a second capping layer 140 may be formed on a side of first middle layer 130 opposite first capping layer 120. A second middle layer including silicon oxynitride 150 may be formed on a side of second capping layer 140 opposite first middle layer 130 by chemical vapor deposition at a temperature lower than approximately 230° C. Accordingly, the second middle layer 150 may be formed by a process which is performed at a temperature lower than about 230° C.

Figure 11C:
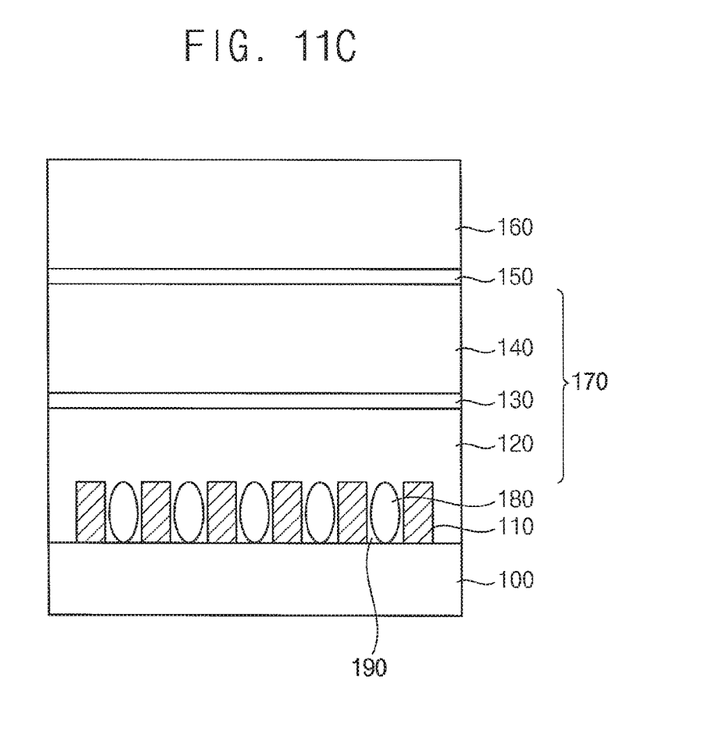

Referring to FIG. 11C, an over-coating layer 160 may be formed on the second middle layer 150. The method of manufacture the polarizer may further include various other processes required to produce the desired display.

Figure 12A:
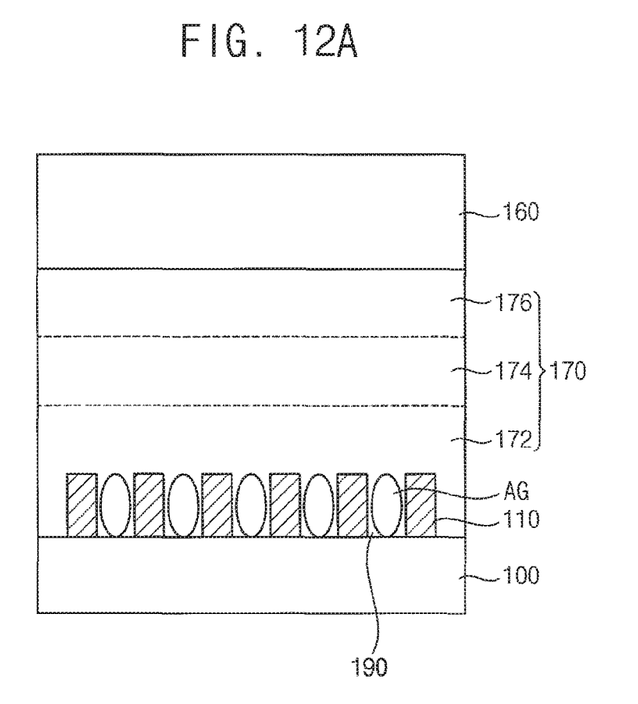
FIGS. 12A and 12B are cross-sectional views illustrating a fourth exemplary method of manufacturing a polarizer according to the principles of the invention.

Referring to FIG. 12A, a wire grid layer 110 may be formed on a base substrate 100. A gradual capping layer 170 may be formed on a side of wire grid layer 110 opposite base substrate 100 by chemical vapor deposition or other known techniques.

The gradual capping layer 170 may formed by changing conditions during chemical vapor deposition, such as initial, mid-process and terminal conditions, to provide a lower layer 172 having a higher content of silicon oxide, an intermediate layer 174 having a relatively higher content of silicon nitride than that of lower layer 172, and an upper layer 176 having a relatively higher content of silicon oxide than that of intermediate later 174.

For example, chemical vapor disposition may begin by providing an initial gas including $SiH_4$ and $N_2O$. The amount of $NH_3$ and $N_2$ within the gas may then be increased in a stepwise manner, as to provide a gas including $SiH_4$, $N_2O$, $NH_3$ and $N_2$. The amount of $NH_3$ and $N_2$ within the gas may then be decreased in a stepwise manner, as to provide a gas including $SiH_4$ and $N_2O$. Accordingly, the lower layer 172 containing relatively large amount of silicon oxide, the intermediate layer 174 containing relatively large amount of silicon nitride, and the upper layer 176 containing relatively large amount of silicon oxide may be formed. During chemical vapor disposition, the temperature may remain at below approximately 230° C. such that the capping layer 170 is formed by a process performed at a temperature lower than approximately 230° C.

Figure 12B:
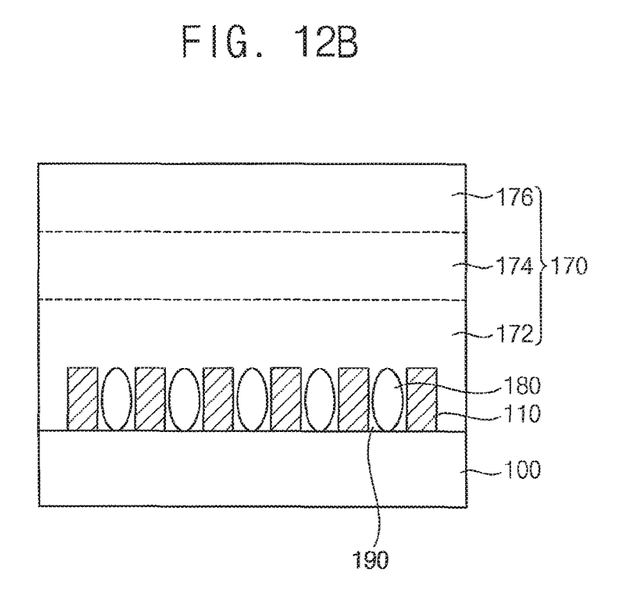

Referring to FIG. 12B, an over-coating layer 160 may be formed on the gradual capping layer 170. The method of manufacture the polarizer may further include various other processes required to produce the desired display.

According to the principles of the invention, a polarizer includes a first capping layer and a second capping layer disposed on a wire grid pattern layer. Since the material constituting the first capping layer is silicon oxide having a relatively low refractive index, even if silicon oxide is partially introduced between the protrusions of the wire grid layer, degradation of the optical performance of the polarizer may not be great.

Transmittance may be improved according to the principles of the invention by a first capping layer including silicon oxide and a second capping layer including silicon nitride, so that the refractive index of the first capping layer may be lower than that of the second capping layer. Such an arrangement may improve transmittance by reducing reflection at the interface of the second capping layer.

In addition, since the second capping layer has a sufficient thickness, active unfilled area (AUA) defects due to outgassing of the air gap and/or the first capping layer including may be reduced, if not prevented. Outgassing may also be reduced, if not prevented, by the multilayer structure of the capping layer according to the principles of the invention.

Moreover, forming the capping layer at a relative low of approximately 230° C. or lower according to the principles of the invention may reduce, if not prevent, damaging organic structures.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A polarizer, comprising:
   a base substrate;
   a wire grid layer having a plurality of protrusions forming a substantially uniform wire grid with a plurality of air gaps disposed between the protrusions;
   a first layer directly disposed on the wire grid layer, the first layer comprising silicon oxide; and
   a second layer directly disposed on the first layer, the second layer comprising silicon nitride or silicon oxynitride.

2. The polarizer of claim 1, wherein at least one of the air gaps includes a silicon oxide material adjacent to at least one of the protrusions.

3. The polarizer of claim 1, wherein the second layer comprises a capping layer having a thickness of about 4000 to about 10000 Å.

4. The polarizer of claim 1, wherein the first layer comprises a capping layer having a thickness of about 2000 Å or more.

5. The polarizer of claim 1, further comprising:
a middle layer on the second layer,
wherein the second layer comprises silicon nitride and the middle layer comprises silicon oxynitride.

6. A polarizer, comprising:
a base substrate;
a wire grid layer having a plurality of protrusions forming a substantially uniform wire grid with a plurality of air gaps disposed between the protrusions;
a first layer having a thickness and disposed on the wire grid, the first layer comprising silicon oxide, and silicon nitride, and wherein the ratio of silicon oxide to silicon nitride varies according to depth in its thickness.

7. The polarizer of claim 6, wherein the first layer further comprises a capping layer having:
a lower layer comprising a first amount of silicon oxide and a first amount of silicon nitride;
an upper layer located on a side of the lower layer opposite the wire grid, the upper layer comprising a second amount of silicon oxide and a second amount of silicon nitride; and
an intermediate layer located between the upper layer and the lower layer, the intermediate layer comprising a third amount of silicon oxide lower than the first amount of silicon oxide and the second amount of silicon oxide, and a third amount of silicon nitride being higher than the first amount of silicon nitride and the second amount of silicon nitride.

8. A method of manufacturing a polarizer, the method comprising the steps of:
forming on a substrate a wire grid layer having a plurality of protrusions forming a substantially uniform wire grid;
forming a first layer comprising silicon oxide on the wire grid layer;
forming between at least two of the protrusions of the wire grid layer an air gap;
heating the first layer such that it partially flows between the at least two protrusions to surround the air gap; and
forming a second layer comprising silicon nitride on the first layer.

9. The method of claim 8, wherein the first layer and the second layer are formed at temperature of about 230° C. or lower.

10. The method of claim 8, wherein the second layer is formed as a capping layer having a thickness of about 4000 to about 10000 Å, and
the first layer is formed as a capping layer having a thickness of about 2000 Å or more.

11. The method of claim 8, further comprising:
forming a first middle layer comprising silicon oxynitride on the first layer before forming the second layer.

12. The method of claim 11, further comprising:
forming a second middle layer comprising silicon oxynitride on the second layer.

13. A method of manufacturing a polarizer, the method comprising the steps of:
forming on a substrate a wire grid layer having a plurality of protrusions forming a substantially uniform wire grid;
forming a first layer having a thickness on the wire grid, the layer comprising silicon oxide and silicon nitride, wherein the ratio of silicon oxide to silicon nitride varies according to depth in its thickness; and
forming between at least two of the protrusions of the wire grid layer an air gap having silicon oxide adjacent to at least one of the two protrusions.

14. The method of claim 13, wherein the formation of the first layer comprises:
forming a lower layer comprising a first amount of silicon oxide and a first amount of silicon nitride;
forming an upper layer on a side of the lower layer opposite the wire grid, the upper layer comprising a second amount of silicon oxide and a second amount of silicon nitride; and
forming an intermediate layer between the upper layer and the lower, the intermediate layer comprising a third amount of silicon oxide lower than the first amount of silicon oxide and the second amount of silicon oxide, and a third amount of silicon nitride higher than the first amount of silicon nitride and the second amount of silicon nitride.

15. The method of claim 13, wherein the first layer is formed by a chemical vapor deposition process comprising:
providing a first gas comprising an initial amount of $SiH_4$ and $N_2O$;
increasing an amount of $NH_3$ within the first gas;
increasing an amount of $N_2$ within the first gas, the increase in $N_2$ providing a second gas comprising $SiH_4$, $N_2O.NH_3$ and $N_2$; and
decreasing the amount of $NH_3$ and $N_2$ within the second gas, the decrease in $NH_3$ and $N_2$ providing a third gas comprising $SiH_4$ and $N_2O$.

16. A display apparatus, comprising:
a TFT substrate;
an opposite substrate facing the TFT substrate; and
a liquid crystal layer between the TFT substrate and the opposite substrate,
wherein the opposite substrate comprises:
a base substrate;
a wire grid layer having a plurality of protrusions forming a substantially uniform wire grid and a plurality of air gaps disposed between the protrusions;
a first layer directly disposed on the wire grid layer, the first layer comprising silicon oxide; and
a second layer directly disposed on the first layer, the second layer comprising silicon nitride or silicon oxynitride.

17. The display apparatus of claim 16, further comprising:
a black matrix on a side of the second layer; and
an over-coating layer disposed on the black matrix.

18. The display apparatus of claim 16, further comprising a color conversion layer on the base substrate, the color conversion layer comprising at least one of a phosphor and a quantum dot.

19. A polarizer, comprising:
a base substrate;
a wire grid layer having a plurality of protrusions forming a substantially uniform wire grid and a plurality of air gaps disposed between the protrusions;
a first layer directly disposed on the wire grid layer, the first layer comprising silicon oxide; and
a second layer directly disposed on the first layer, the second layer comprising silicon nitride and having a thickness of about 4000 to about 10000 Å.

* * * * *